(12) United States Patent
Fujikawa

(10) Patent No.: US 12,091,121 B2
(45) Date of Patent: Sep. 17, 2024

(54) SUSPENSION DEVICE AND FRONT FORK

(71) Applicant: Hitachi Astemo, Ltd., Hitachinaka (JP)

(72) Inventor: Yosuke Fujikawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 457 days.

(21) Appl. No.: 17/556,469

(22) Filed: Dec. 20, 2021

(65) Prior Publication Data
US 2022/0111923 A1    Apr. 14, 2022

Related U.S. Application Data

(63) Continuation of application No. PCT/JP2019/030231, filed on Aug. 1, 2019.

(51) Int. Cl.
| | |
|---|---|
| *B62J 45/40* | (2020.01) |
| *B62K 25/04* | (2006.01) |
| *B62K 25/08* | (2006.01) |
| *B62K 25/10* | (2006.01) |

(52) U.S. Cl.
CPC ............ *B62J 45/40* (2020.02); *B62K 25/08* (2013.01); *B62K 2025/044* (2013.01); *B62K 25/10* (2013.01)

(58) Field of Classification Search
CPC ........ B62K 25/06; B62K 25/08; B62K 25/10; B62K 2025/044
See application file for complete search history.

(56) References Cited

U.S. PATENT DOCUMENTS

| | | | | |
|---|---|---|---|---|
| 7,124,865 B2* | 10/2006 | Turner | ................. | B60G 17/002 |
| | | | | 188/314 |
| 8,864,160 B2* | 10/2014 | Awasa | ................... | B62K 25/08 |
| | | | | 280/279 |
| 11,313,428 B2* | 4/2022 | Tokuhara | .............. | F16F 13/007 |

(Continued)

FOREIGN PATENT DOCUMENTS

| | | |
|---|---|---|
| JP | 53110550 A | 9/1978 |
| JP | 60024401 A | 2/1985 |

(Continued)

OTHER PUBLICATIONS

International Search Report mailed Oct. 21, 2019 for the corresponding International Patent Application No. PCT/JP2019/030231.

*Primary Examiner* — Kevin Hurley
*Assistant Examiner* — Hosam Shabara
(74) *Attorney, Agent, or Firm* — Leason Ellis LLP; Edward J. Ellis; Melvin C. Garner

(57) ABSTRACT

A suspension device includes an outer tube formed of a cylindrical body an inner tube disposed coaxially with the outer tube and provided to be movable relative to the outer tube, a tip end of the inner tube being disposed inside the outer tube, a cable harness extending from an outer side of the outer tube or the inner tube to an inner side and configured to be energized, a stroke sensor configured to detect a movement amount of the inner tube relative to the outer tube, two connection members disposed between the stroke sensor and the cable harness and connecting the stroke sensor and the cable harness, and a correction unit disposed inside the outer tube or the inner tube and configured to correct the movement amount detected by the stroke sensor based on a temperature inside the outer tube or the inner tube.

7 Claims, 8 Drawing Sheets

(56) References Cited

U.S. PATENT DOCUMENTS

| | | | |
|---|---|---|---|
| 2016/0265943 A1* | 9/2016 | Murakami | G01D 5/202 |
| 2020/0191228 A1 | 6/2020 | Tokuhara et al. | |
| 2022/0163086 A1* | 5/2022 | Ikeda | F16F 9/165 |
| 2023/0364960 A1* | 11/2023 | Tokuhara | B62J 45/41 |

FOREIGN PATENT DOCUMENTS

| | | | |
|---|---|---|---|
| JP | 60252833 A | 12/1985 | |
| JP | 62106137 A | 5/1987 | |
| JP | 07139572 A | 5/1995 | |
| JP | 3152533 U | 8/2009 | |
| JP | 2016165984 A | 9/2016 | |
| JP | 6338757 B1 | 6/2018 | |

\* cited by examiner

SUSPENSION DEVICE AND FRONT FORK

CROSS-REFERENCE TO RELATED APPLICATION(S)

This application is a Continuation of International Application No. PCT/JP2019/030231 filed on Aug. 1, 2019, the content of which is incorporated herein by reference in its entirety.

FIELD OF THE INVENTION

The present invention relates to a suspension device such as a front fork or the like.

BACKGROUND OF THE INVENTION

In general, a front wheel of a straddle type vehicle is supported by a vehicle body via a front fork. In a suspension device such as a front fork, a cylindrical body fixed to the vehicle body and a cylindrical body fixed to the front wheel are coaxially arranged, and a force is applied in a direction in which the cylindrical bodies are separated from each other. In the suspension device, the two cylindrical bodies are displaced relative to each other and absorb an impact received from the ground during traveling. A stroke sensor which detects a stroke amount of the cylindrical body is mounted on a part of such a suspension device. JP-A-2016-165984 discloses a technique serving as a technique in the related art related to a stroke sensor system.

The stroke sensor system disclosed in JP-A-2016-165984 includes a cylindrical conductor and a coil.

A fitting length (an overlapping length) between the conductor and the coil changes in accordance with the stroke amount. At this time, when an alternating current flows through the coil, an eddy current is generated in the conductor so as to cancel a fluctuation of a magnetic field. When the eddy current is generated, an inductance of the coil is changed due to the influence of the eddy current. Accordingly, a resonance frequency of an LC oscillation circuit is changed, and a stroke amount can be obtained from the resonance frequency.

The suspension device provided with the stroke sensor system disclosed in JP-A-2016-165984 has various temperatures. Since a difference in temperatures may affect accuracy of the sensor, the suspension device needs to be improved.

SUMMARY OF THE INVENTION

An object of the present invention is to provide a suspension device in which temperature characteristics of a sensor are improved.

As a result of intensive studies, the present inventors have found that a correction unit which corrects a movement amount detected by a stroke sensor based on a temperature inside a cylindrical body is disposed inside the cylindrical body. Accordingly, it is possible to provide a suspension device in which temperature characteristics of a sensor are improved while the suspension device is arranged in a compact manner. The present invention has been completed based on this finding.

Hereinafter, the present invention will be described. In the following description, for ease of understanding of the present invention, reference numerals in the accompanying drawings are appended in parentheses, but the present invention is not limited to the illustrated embodiments.

According to one aspect of the present invention, there is provided a suspension device (20, 20A, 20B). The suspension device (20, 20A, 20B) includes
an outer tube (22) formed of a cylindrical body,
an inner tube (23) disposed coaxially with the outer tube, and provided to be movable relative to the outer tube, a tip end of the inner tube (23) is disposed inside the outer tube,
a cable harness (26) extending from an outer side of the outer tube or the inner tube to an inner side, and configured to be energized,
a stroke sensor (30) configured to detect a movement amount of the inner tube relative to the outer tube,
at least one connection member (28) disposed between the stroke sensor and the cable harness and connecting the stroke sensor and the cable harness, and
a correction unit (40, 40A, 40B) disposed inside the outer tube or the inner tube, and configured to correct the movement amount detected by the stroke sensor based on a temperature inside the outer tube or the inner tube.

The correction unit (40, 40A, 40B) may include a substrate (42, 42A, 42B) and a capacitor (43, 43A, 43B) supported by the substrate.

At least one connection member may include two connection members (28), and
at least a part of the correction unit (40, 40A, 40B) may be located between the two connection members.

The cable harness (26) may include at least two conductive wires (26a), and
the two connection members (28) may be provided corresponding to the two conductive wires.

The substrate (42A) may be electrically connected to and supported by the two connection members (28) respectively via clip members (48A) which can be energized.

The stroke sensor (30) may have a characteristic that an inductance increases as temperature rises, and
the capacitor (43, 43A, 43B) may have a characteristic that a capacitance decreases as temperature rises.

According to another aspect of the present invention, there is provided a front fork (20). The front fork (20) includes
an outer tube (22) formed of a cylindrical body,
an inner tube (23) disposed coaxially with the outer tube, and provided to be movable relative to the outer tube, the upper end of the inner tube is disposed inside the outer tube,
a cable harness (26) extending from an outer side of the outer tube to an inner side and configured to be energized,
a stroke sensor (30) configured to detect a movement amount of the inner tube relative to the outer tube and having a characteristic that an inductance increases as temperature rises,
two connection members (28) disposed between the stroke sensor and the cable harness and connecting the stroke sensor and the cable harness, and
a correction unit (40) disposed inside the outer tube, and configured to correct the movement amount detected by the stroke sensor based on a temperature inside the outer tube.

The correction unit includes
a substrate (42) located above the cable harness, each of the connection members being connected, and
a capacitor (43) provided on an upper surface of the substrate and having a characteristic that a capacitance decreases as temperature rises.

According to the present invention, it is possible to provide a suspension device in which temperature characteristics of a sensor are improved.

DETAILED DESCRIPTION OF THE INVENTION

Figure 1:
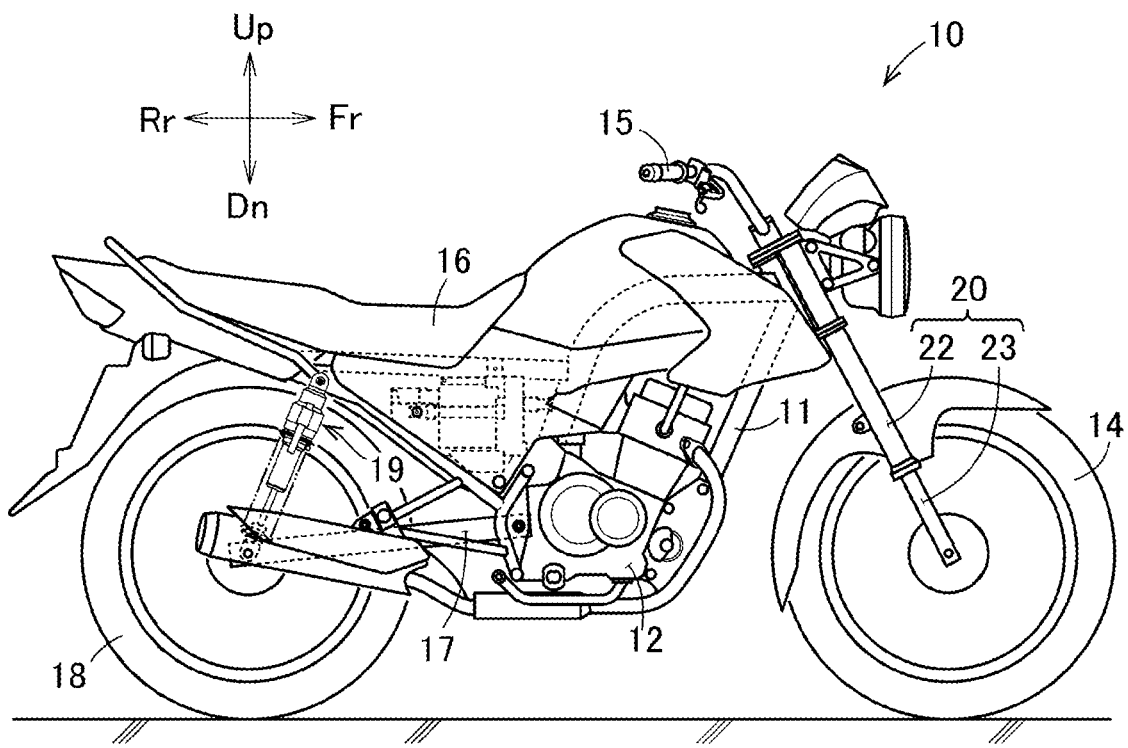
FIG. 1 is a side view illustrating a two-wheel vehicle 10 on which suspension devices 19 and 20 according to a first embodiment are mounted.

Embodiments of the present invention will be described below with reference to the accompanying drawings. In the description, left and right refer to left and right with respect to an occupant of a vehicle, and front and rear refer to front and rear with respect to a traveling direction of the vehicle. In the drawings, Up indicates an upper direction, and Dn indicates a lower direction. The embodiments illustrated in the accompanying drawings are examples of the present invention, and the present invention is not limited to the embodiments.

First Embodiment

Description will be made with reference to FIG. 1. A suspension device according to the present invention can be used as a front fork 20 or a rear cushion 19. Hereinafter, an example in which the present invention is applied to the front fork 20 of the two-wheel vehicle 10 will be described.

The two-wheel vehicle 10 (a straddle type vehicle 10) includes a vehicle body 11, an engine 12 serving as a power source supported at a lower center portion of the vehicle body 11, left and right front forks 20 (only the right front fork 20 is illustrated in the drawing) which are provided at left and right sides of a front portion of the vehicle body 11 and absorb an impact received due to unevenness of a road surface, a front wheel 14 which is disposed between the front forks 20 and is rotatably supported, handle pipes 15 which are disposed at upper portions of the front forks 20 and steer the front wheel 14, a seat 16 which is provided above the engine 12 and on which an occupant sits, a swing arm 17 which extends from a rear portion of the vehicle body 11 to a rear side and is swingable in an upper-lower direction, a rear wheel 18 which is rotatably supported by the swing arm 17, and left and right rear cushions 19 (only the right rear cushion 19 is illustrated in the drawing) which are provided to cross from a rear portion of the vehicle body 11 to the swing arm 17.

The left and right front forks 20 have the same configuration. Hereinafter, the right front fork 20 will be described, and the description of the left front fork will be omitted. The left and right front forks 20 may have different configurations depending on the purpose.

An upper end of the front fork 20 is fixed to the vehicle body 11 and a lower end of the front fork 20 is fixed to the front wheel 14.

Figure 2:
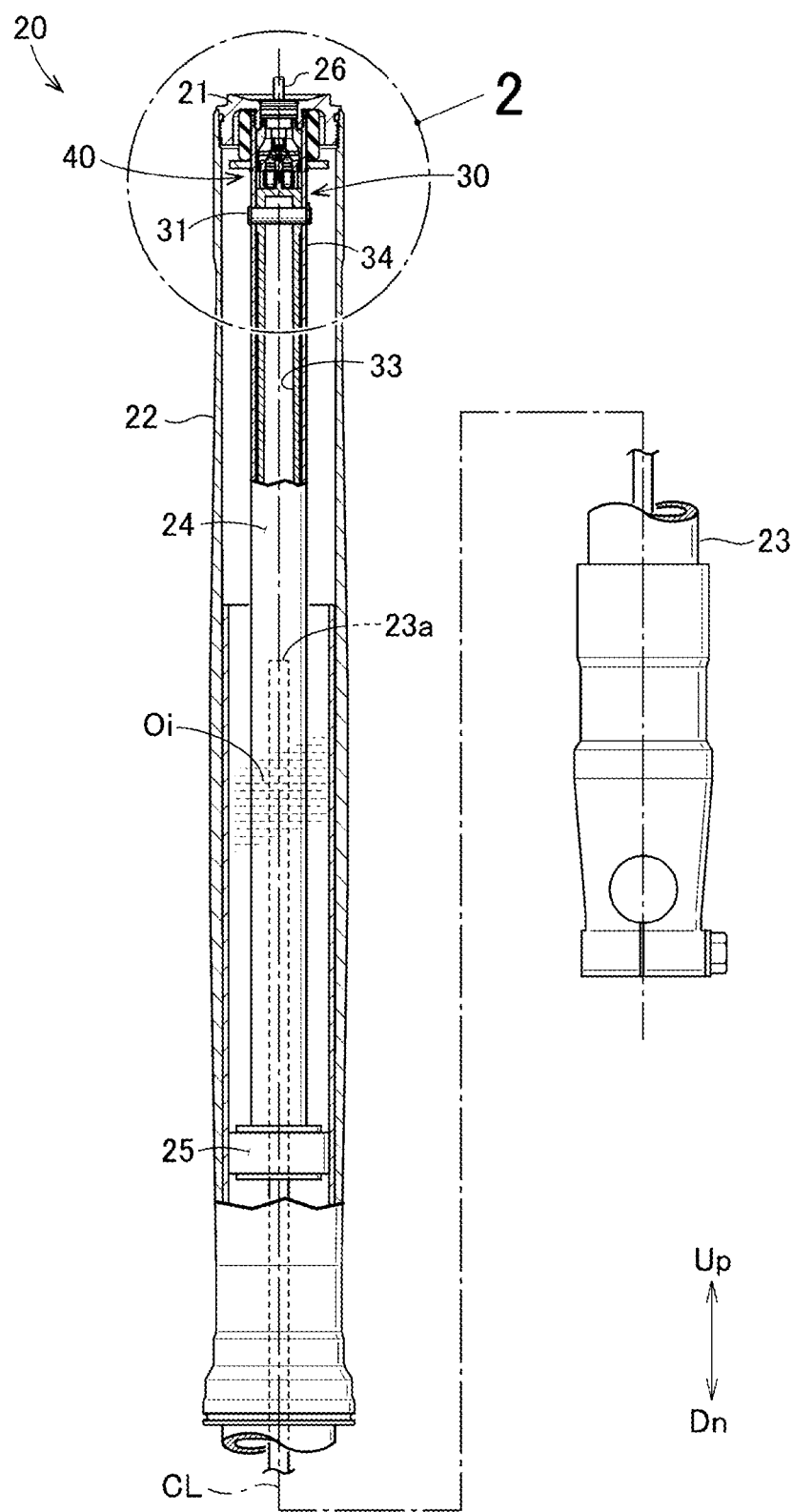
FIG. 2 is a cross-sectional view illustrating a main part of the suspension device 20.
Figure 3:
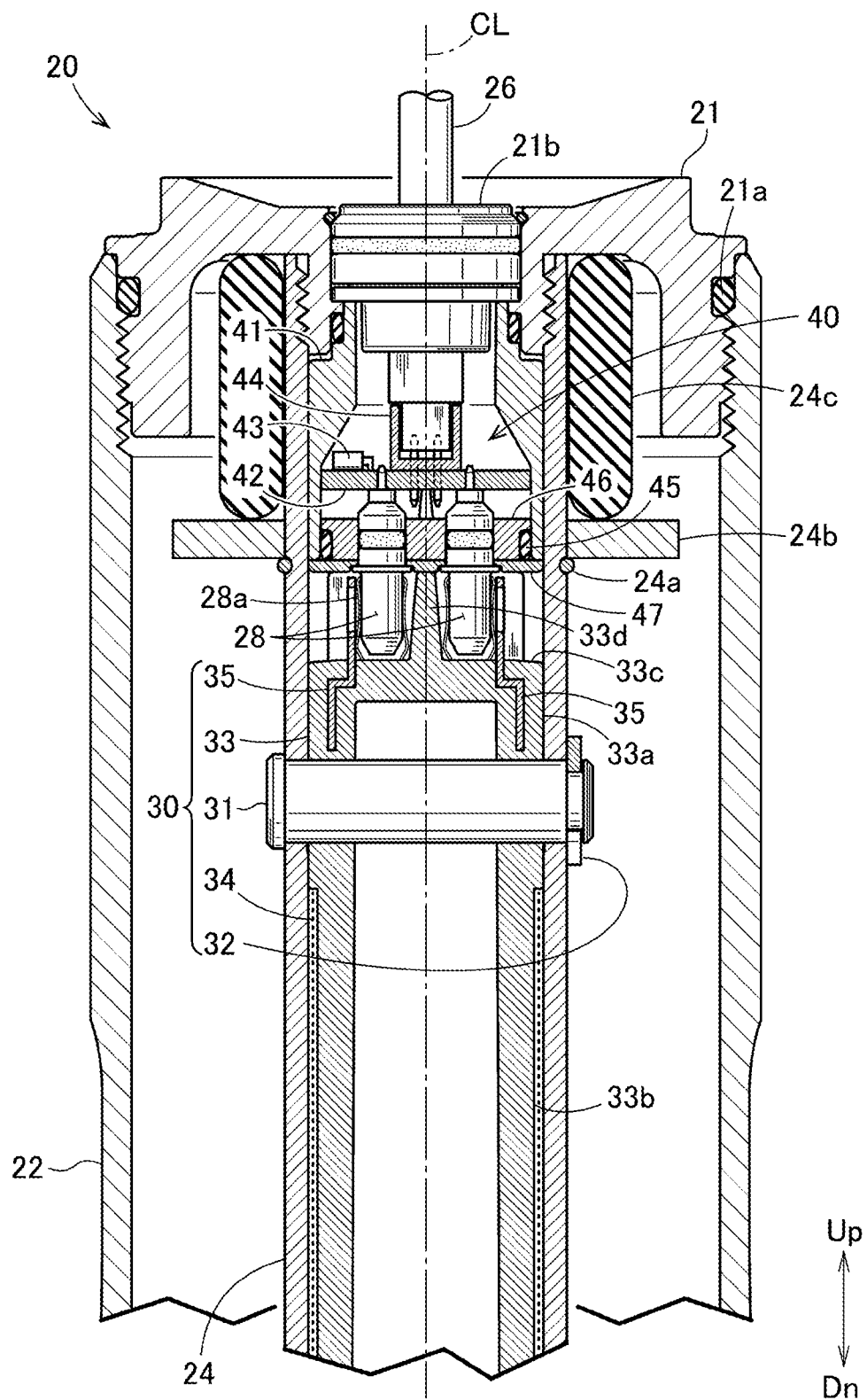
FIG. 3 is an enlarged view illustrating a portion 3 in FIG. 2.

Description will be made with reference to FIGS. 2 and 3. The front fork 20 includes an outer tube 22 which is disposed at an upper portion and of which an upper end is closed by a lid body 21, an inner tube 23 which extends downward from an inner side of the outer tube 22 and is provided to be movable relative to the outer tube 22, a rod 24 which extends to an inner side of the inner tube 23 and is supported by the outer tube 22, a piston 25 which is fixed to the rod 24 and can generate a damping force, a cable harness 26 which extends from an outer side to an inner side of the outer tube 22 and includes a plurality of conductive wires which can be energized, a stroke sensor 30 to which the cable harness 26 is connected and which can detect a movement amount of the inner tube 23 relative to the outer tube 22, connection members 28 and 28 which are disposed between the stroke sensor 30 and the cable harness 26 and connect the stroke sensor 30 and the cable harness 26, and a correction unit 40 which corrects the movement amount detected by the stroke sensor 30 based on a temperature inside the outer tube 22.

Description will be made with reference to FIG. 3. The lid body 21 is formed into a cylindrical shape, and is screwed to an inner circumferential surface of the outer tube 22. An O-ring 21a serving as a seal is provided on an outer circumferential surface of the lid body 21. A hole is formed in the center of the lid body 21, and a seal member 21b is provided in the hole. The seal member 21b has a sealing property and supports the cable harness 26 which passes through the seal member 21b.

The outer tube 22 is a cylindrical member of which an upper portion is supported by the vehicle body. An axial center of the outer tube 22 coincides with an axis CL of the rod 24, and an axial direction of the outer tube 22 is parallel to the axis CL.

The inner tube 23 is applied with a force in a direction away from the outer tube 22 by a spring (not illustrated). The inner tube 23 includes a conductor portion 23a provided inside the stroke sensor 30 along the axis CL. A lower end of the conductor portion 23a is fixed to an axle side.

The rod 24 is formed into a cylindrical shape, and one end of the rod 24 is supported by the outer tube 22 via the lid body 21. Accordingly, the rod 24 can be displaced together with the outer tube 22. That is, the rod 24 is provided to be movable relative to the inner tube 23.

A stopper ring 24a is fitted on an outer circumference of the rod 24, and a plate-shaped member 24b of which a downward movement is restricted by the stopper ring 24a is provided on the outer circumference of the rod 24. The plate-shaped member 24b and the lid body 21 sandwich a stopper rubber 24c made of rubber.

Description will be made with reference to FIG. 2. An upper portion of the inner tube 23 is positioned inside the outer tube 22, and a lower portion of the inner tube 23 is exposed to the outside. The lower portion of the inner tube 23 is fixed to a shaft of the front wheel. The inner tube 23 is filled with oil Oi. An axial center of the inner tube 23 coincides with the axis CL of the rod 24, and an axial direction of the inner tube 23 is parallel to the axis CL.

The piston 25 is movable along an inner circumferential surface of the inner tube 23 together with the rod 24. The oil Oi can pass through an inner side of the piston 25, and the piston 25 generates a damping force when the piston 25 moves together with the rod 24. Here, the inner tube 23 is provided to be movable relative to the outer tube 22, the rod 24, and the piston 25. Therefore, it can be said that the piston 25 generates a damping force when the piston 25 moves relative to the inner tube 23 and the outer tube 22. The piston 25 generates a damping force both at the time of expansion and at the time of compression.

One end of the cable harness 26 is connected to the stroke sensor 30, and the other end of the cable harness 26 is connected to an electronic control unit (ECU). When the stroke sensor 30 is formed at the inner tube 23 side, the cable harness 26 is inserted into the inner tube 23 from a lower end of the inner tube 23.

Figure 4:
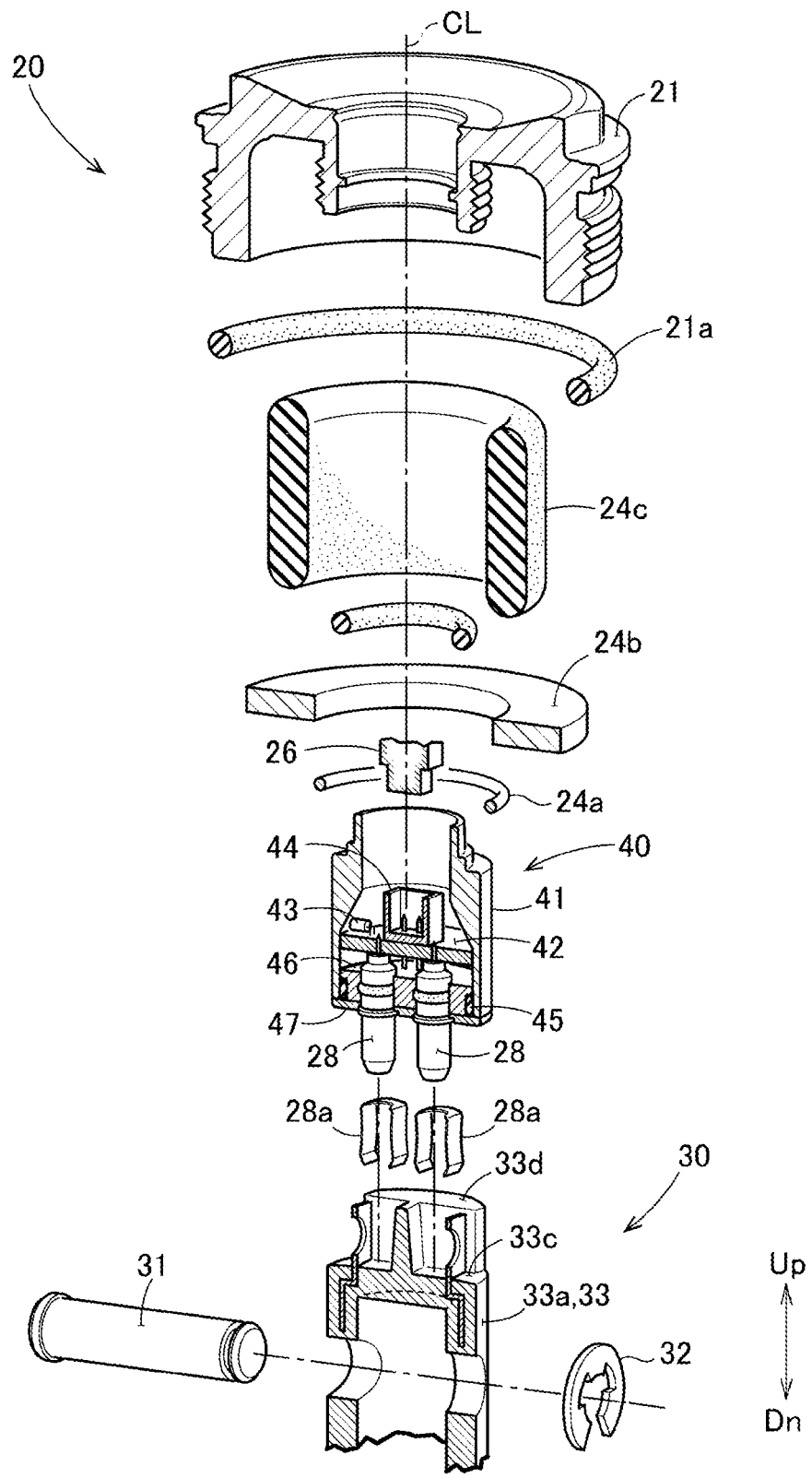
FIG. 4 is an exploded perspective view illustrating a main part of the suspension device 20 illustrated in FIG. 3.

Description will be made with reference to FIGS. 3 and 4. The stroke sensor 30 includes a pin 31 which extends perpendicularly to the axis CL and passes through the rod 24, a retaining ring 32 which is provided at a tip end of the pin 31 and prevents the pin 31 from coming off the rod 24, a bottomed cylindrical coil support body 33 which is supported by the rod 24 via the pin 31, a coil 34 which is wound around an outer circumferential surface of the coil support body 33, and two conducts 35 and 35 which extend upward from an upper portion of the coil support body 33 and can be energized. The stroke sensor 30 has a characteristic that the inductance increases as the temperature rises.

The coil support body 33 includes a large diameter portion 33a through which the pin 31 passes and which is provided along an inner circumferential surface of the rod 24, a small diameter portion 33b which continuously extends downward from a lower end of the large diameter portion 33a and has a diameter smaller than a diameter of the large diameter portion 33a, a bottom portion 33c which closes an upper end of the large diameter portion 33a, and a wall portion 33d which protrudes upward from the bottom portion 33c. The conductor portion 23a (see FIG. 2) faces an inner side of the coil support body 33.

The stroke sensor 30 may be formed at the inner tube 23 side.

Respective lower portions of the connection members 28 and 28 are connected to the coil supporting body 33 via elastic bodies 28a and 28a which can be energized and have elasticity. Respective upper portions of the connection members 28 and 28 are connected to the cable harness 26 via the correction unit 40. That is, the connection members 28 and 28 are disposed between the stroke sensor 30 and the cable harness 26, and connect the stroke sensor 30 and the cable harness 26. The elastic body 28a is in contact with both the connection member 28 and the conductor 35.

Figure 5:
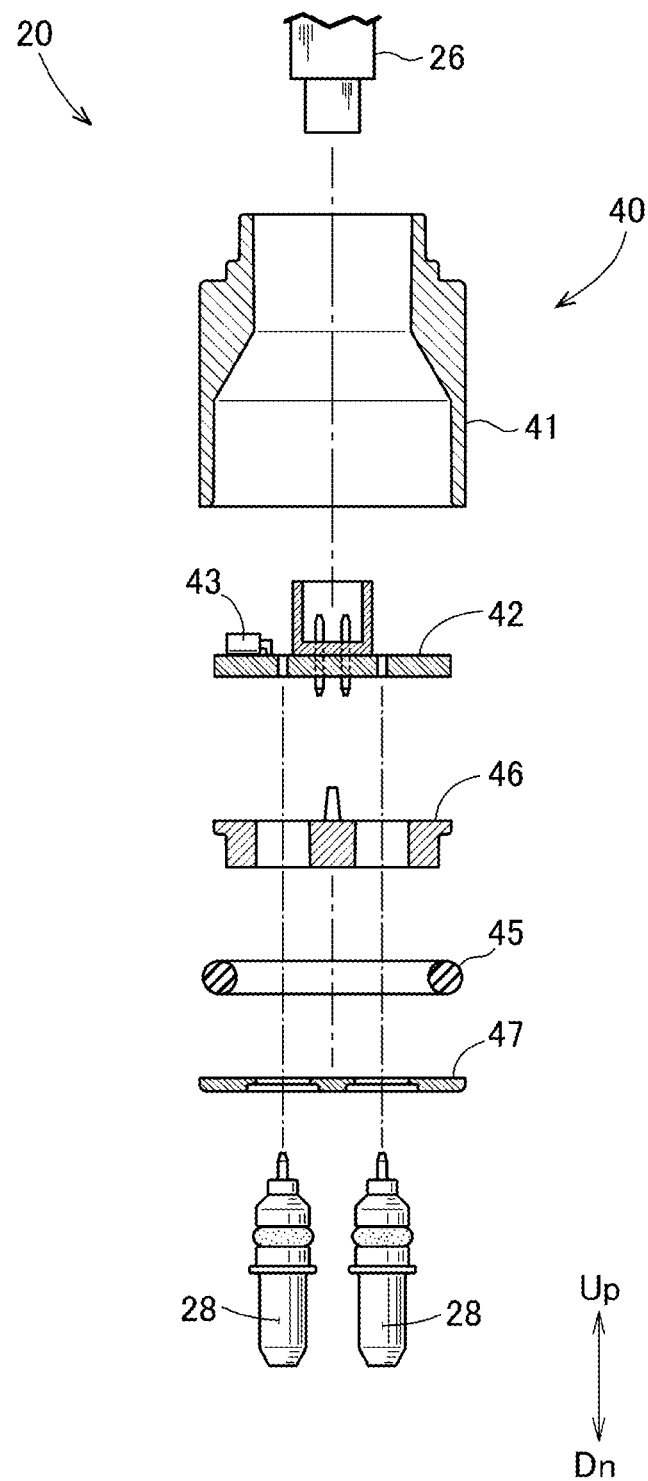
FIG. 5 is an exploded view illustrating a correction unit 40 and a connection member 28 illustrated in FIG. 4.

Description will be made with reference to FIGS. 3 and 5. The correction unit 40 is integrated with the connection members 28 and 28. The correction unit 40 includes a substantially cylindrical collar 41 of which an upper end comes into contact with an inner circumference of the lid body 21, a substrate 42 mounted on the upper portions of the two connection members 28 and 28 inside the collar 41, and a capacitor 43 for temperature compensation which is mounted on the substrate 42. The correction unit 40 further includes a connector 44 which is mounted on the substrate 42 and is connected to the cable harness 26, a terminal holder 46 which is provided on an inner circumference of the collar 41 via an O-ring 45 and holds the two connection members 28 and 28, and an end plate 47 provided at a lower end of the collar 41.

The substrate 42 is, for example, a printed substrate on which a wiring pattern is printed on a glass plate. A part of a circuit substrate of an oscillation unit of an LC oscillation circuit can also be used as the substrate 42.

The capacitor 43 is, for example, a ceramic capacitor. The capacitor 43 has a characteristic that the capacitance decreases as the temperature rises.

A function of the front fork 20 described above will be described.

Description will be made with reference to FIGS. 1 and 2. The front fork 20 expands and compresses when the two-wheel vehicle 10 travels on an unevenness road surface. At the time of compression, the outer tube 22 and the inner tube 23 come close to each other against a force applied by the above-described spring. After the compression, the outer tube 22 and the inner tube 23 are separated from each other by the force applied by the spring and return to original positions. During traveling, expansion and contraction are repeated in a short period of time.

The piston 25 is configured such that oil can pass through the inner side of the piston 25, and the piston 25 is movable in an upper-lower direction together with the rod 24. When the piston 25 moves in the upper-lower direction along an inner circumferential surface of the inner tube 23, oil passes through the inner side of the piston 25, and a damping force is generated.

When the front fork 20 is compressed, the outer tube 22 is lowered relative to the inner tube 23. Accordingly, a length of a portion of the coil 34 overlapping with the conductor portion 23a in a direction of the axis CL of the rod 24 is further increased. At this time, when an alternating current flows through the coil 34, an eddy current is generated in the conductor portion 23a so as to cancel a fluctuation of a magnetic field. The eddy current apparently reduces the inductance of the coil 34. When the inductance of the coil 34 is small, a resonance frequency of the LC oscillation circuit is small.

When the front fork 20 is expanded, the outer tube 22 is raised relative to the inner tube 23. Accordingly, the length of the portion of the coil 34 overlapping with the conductor portion 23a in the direction of the axis CL of the rod 24 is further reduced. At this time, an influence of the eddy current is smaller than that in the case where the front fork is compressed. Therefore, the inductance is increased. When the inductance of the coil 34 is large, the resonance frequency of the LC oscillation circuit is large. A stroke amount of the front fork 20 can be obtained from these resonance frequencies.

Description will be made with reference to FIG. 3. The inductance of the coil 34 increases as the temperature rises. The temperature inside the front fork 20 changes due to an influence of the temperature of oil and the like. Therefore, an error may occur in the stroke amount detected by the stroke sensor 30 depending on the temperature inside the front fork 20. The error which may occur due to the temperature change is corrected by the capacitor 43 having a characteristic that the capacitance decreases as the temperature rises. That is, a movement amount detected by the stroke sensor 30 is corrected by the correction unit 40 based on the temperature inside the outer tube 22.

The front fork 20 described above is summarized as follows.

The front fork 20 includes
the outer tube 22 formed of a cylindrical body,
the inner tube 23 disposed coaxially with the outer tube 22, and provided to be movable relative to the outer tube 22, a tip end of the inner tube being disposed inside the outer tube, the cable harness 26 extending from an outer side of the outer tube 22 to an inner side, and can be energized, the stroke sensor 30 that can detect a movement amount of the inner tube 23 relative to the outer tube 22, at least one connection member 28 disposed between the stroke sensor 30 and the cable harness 26 and connecting the stroke sensor 30 and the cable harness 26, and the correction unit 40 disposed inside the outer tube 22, and corrects the movement amount detected by the stroke sensor 30 based on a temperature inside the outer tube 22.

The movement amount detected by the stroke sensor 30 is corrected by the correction unit 40 based on the temperature inside the outer tube 22. Accordingly, it is possible to provide the front fork 20 in which temperature characteristics of a sensor are improved. In addition, since the correction unit 40 is disposed inside the outer tube 22, the correction unit 40 can be disposed in a compact manner. That is, it is possible to provide the front fork 20 in which the temperature characteristics of the sensor are improved without increasing the size. The same applies to a case where the correction unit 40 is disposed inside the inner tube 23.

Further, the correction unit 40 includes the substrate 42 and the capacitor 43 supported by the substrate 42. With such a configuration, for example, a component and a substrate for an LC oscillation circuit can be shared. As a result, it is possible to improve the temperature characteristics of the sensor while preventing an increase in the number of components. The correction unit 40 can be configured at a low cost by using the capacitor 43.

Further, the at least one connection member includes two connection members 28 and 28, and a part of the terminal holder 46 which is an element constituting the correction unit 40 is located between the two connection members 28 and 28.

Since a part of the correction unit 40 is disposed between the two connection members 28 and 28, a dead space can be effectively utilized, and the correction unit 40 can be disposed in a compact manner.

Further, the temperature sensor 30 has a characteristic that the inductance increases as the temperature rises, and the capacitor 43 has a characteristic that the capacitance decreases as the temperature rises. Accordingly, it is possible to prevent a change in an oscillation cycle due to the influence of the temperature.

Next, a second embodiment will be described with reference to the drawings.

Second Embodiment

Figure 6:
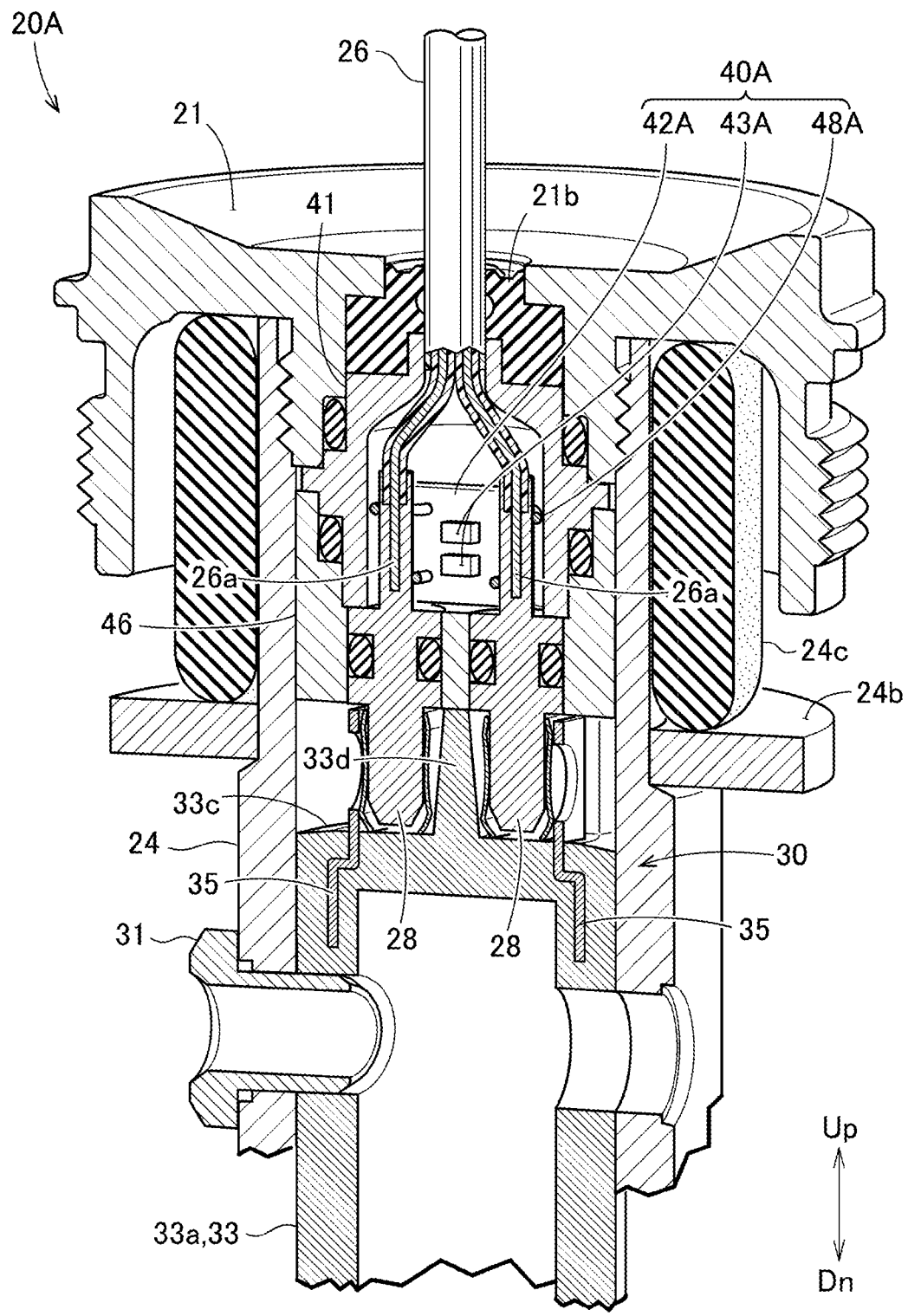
FIG. 6 is a perspective view illustrating a cross-section of a main part of a suspension device 20A according to a second embodiment.
Figure 7:
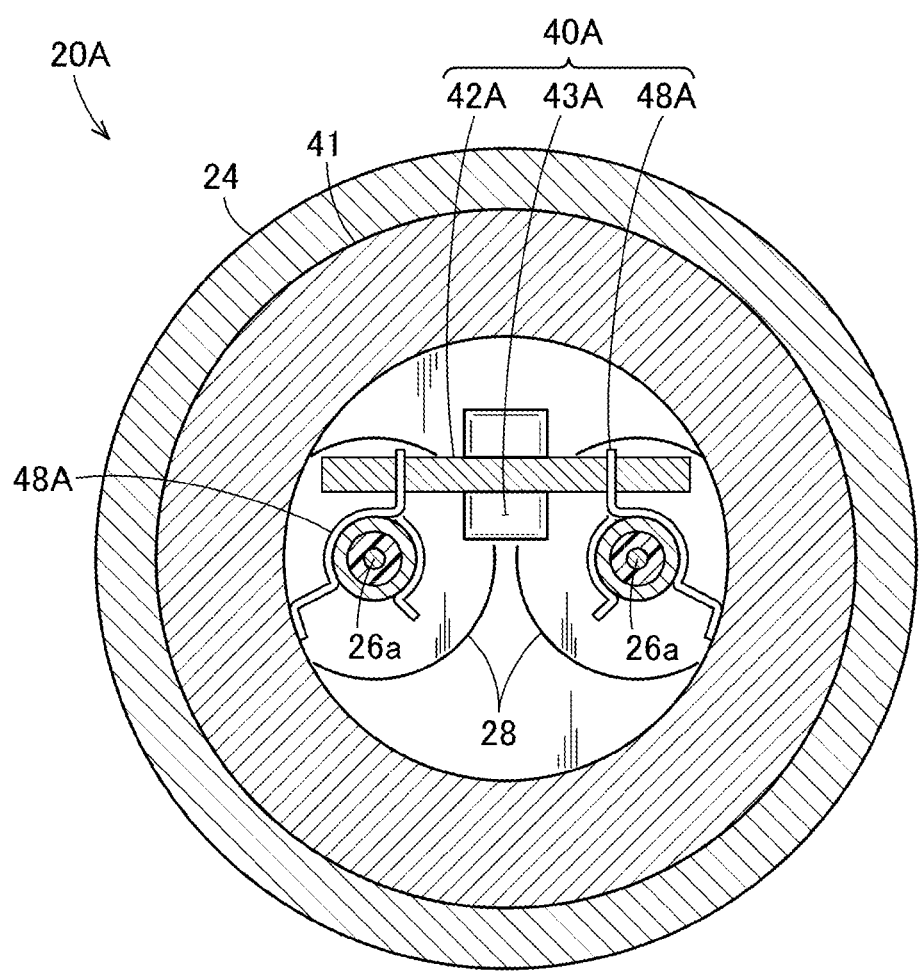
FIG. 7 is a plan view illustrating a correction unit 40A of the suspension device 20A illustrated in FIG. 5.

Description will be made with reference to FIGS. 6 and 7. FIGS. 6 and 7 illustrate a front fork 20A according to the second embodiment. The front fork 20A is different from the front fork 20 in an attachment manner of a correction unit 40A. Other basic configurations of the front fork 20A are the same as those of the front fork 20. The same components as those of the front fork 20 are denoted by the same reference numerals as those used in FIGS. 1 to 5, and detailed description thereof will be omitted.

In the correction unit 40A, two clips 48A and 48A which can be energized are inserted into a substrate 42A erected along the connection members 28 and 28, and each of the clips 48A and 48A sandwiches the connection member 28. Accordingly, the substrate 42A is fixed in a state in which the substrate 42A is electrically connected to the connection members 28 via the clips 48A and 48A. A capacitor 43A provided on the substrate 42A is located between the two connection members 28 and 28.

The front fork 20A described above also achieves the predetermined effects of the present invention.

Further, the cable hardness 26 includes at least two conductive wires 26a and 26a.

The two connection members 28 and 28 are provided respectively corresponding to the conductive wires 26a and 26a.

The capacitor 43A is located between the two connection members 28 and 28.

Since the capacitor 43A is disposed between the two connection members 28 and 28, a dead space can be effectively utilized, and the correction unit 40A can be disposed in a compact manner.

Further, the substrate 42A is electrically connected to and supported by the connection members 28 and 28 respectively via the clips 48A and 48A which can be energized. The substrate 42A is attached and electrically connected to the connection members 28 and 28 via a single member without using separate members. It is possible to arrange the correction unit 40A in a compact manner while preventing an increase in the number of components.

Next, a third embodiment will be described with reference to the drawings.

Third Embodiment

Figure 8:
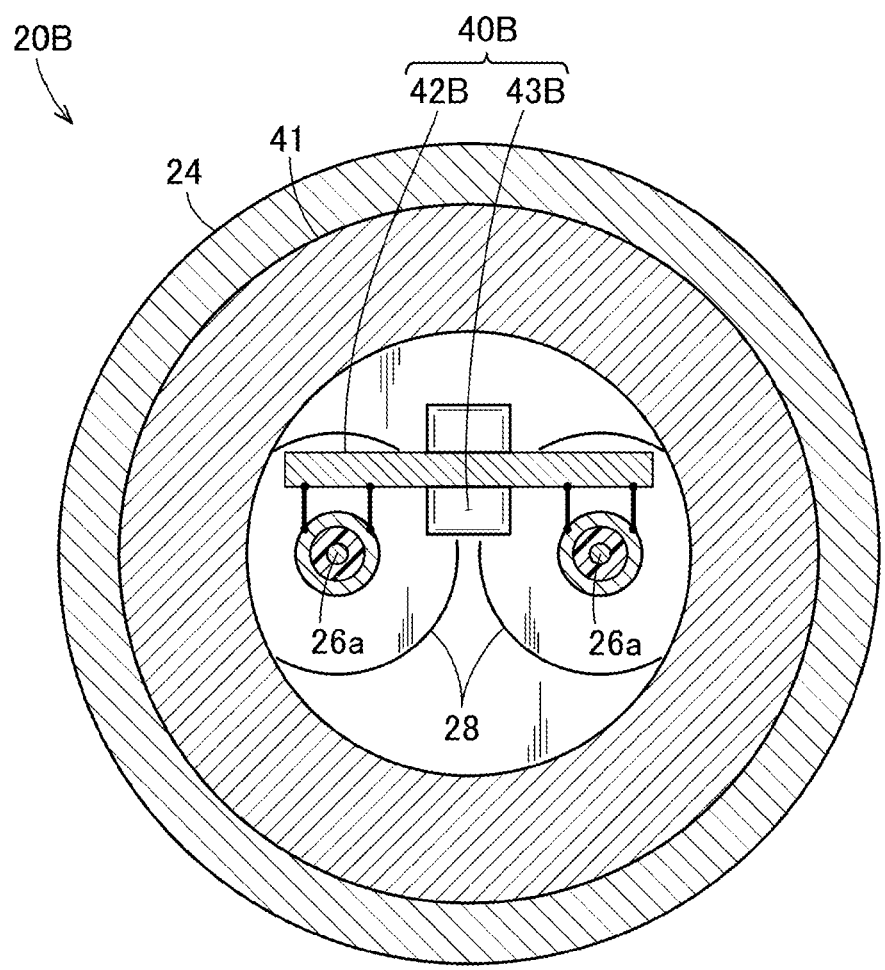
FIG. 8 is a plan view illustrating a correction unit 40B of a suspension device 20B according to a third embodiment.

FIG. 8 illustrates a front fork 20B according to the third embodiment. The front fork 20B is different from the front forks 20 and 20A in an attachment manner of a correction unit 40B. Other basic configurations of the front fork 20B are the same as those of the front forks 20 and 20A. The same components as those of the front fork 20, 20A are denoted by the same reference numerals as those used in FIGS. 1 to 7, and detailed description thereof will be omitted.

A substrate 42B of the correction unit 40B is erected along the connection members 28 and 28, and is fixed to the connection members 28 and 28 by soldering. The substrate 42B is electrically connected to the connection members 28 and 28 via solder. A capacitor 43B provided on the substrate 42B is located between the two connection members 28 and 28.

The front fork 20B described above also achieves the predetermined effects of the present invention.

A case where the present invention is applied to an inverted front fork has been described in the above embodiments related to a suspension device according to the present invention. The present invention is not limited to these embodiments, and can be applied to, for example, a front fork such as an upright front fork, or a rear cushion such as a mono-shock type rear cushion or a twin-shock type rear cushion. That is, the suspension device is not limited to an inverted front fork.

Furthermore, the suspension device is not limited to a two-wheel vehicle, and is also applicable to a three-wheel vehicle, a buggy, and the like. That is, the present invention can be mounted on a straddle type vehicle other than a two-wheel vehicle.

The suspension device according to the present invention is suitable for a front fork of a straddle type vehicle.

The invention claimed is:

1. A suspension device comprising:
an outer tube formed of a cylindrical body;
an inner tube disposed coaxially with the outer tube, and provided to be movable relative to the outer tube, a tip end of the inner tube being disposed inside the outer tube;
a cable harness extending from an outer side of the outer tube or the inner tube to an inner side, and configured to be energized;
a stroke sensor configured to detect a movement amount of the inner tube relative to the outer tube;
two connection members disposed between the stroke sensor and the cable harness and connecting the stroke sensor and the cable harness; and
a correction unit disposed inside the outer tube or the inner tube, and configured to correct the movement amount detected by the stroke sensor based on a temperature inside the outer tube or the inner tube, wherein:
the correction unit includes a substrate and a capacitor supported by the substrate; and
at least a part of the correction unit is located between the two connection members.

2. The suspension device according to claim 1, wherein:
the cable harness includes at least two conductive wires; and
the two connection members are provided corresponding to the two conductive wires.

3. The suspension device according to claim 2, wherein:
the substrate is electrically connected to and supported by each of the two connection members via a clip member configured to be energized.

4. The suspension device according to claim 1, wherein:
the stroke sensor has a characteristic that an inductance increases as temperature rises; and
the capacitor has a characteristic that a capacitance decreases as temperature rises.

5. A front fork comprising:
an outer tube formed of a cylindrical body;
an inner tube disposed coaxially with the outer tube, and provided to be movable relative to the outer tube, the upper end of the inner tube being disposed inside the outer tube;
a cable harness extending from an outer side of the outer tube to an inner side and configured to be energized;
a stroke sensor configured to detect a movement amount of the inner tube relative to the outer tube and having a characteristic that an inductance increases as temperature rises;
two connection members disposed between the stroke sensor and the cable harness and connecting the stroke sensor and the cable harness; and
a correction unit disposed inside the outer tube, and configured to correct the movement amount detected by the stroke sensor based on a temperature inside the outer tube, wherein
the correction unit includes
a substrate located above the two connection members, each of the connection members being connected, and
a capacitor provided on an upper surface of the substrate and having a characteristic that a capacitance decreases as temperature rises.

6. The suspension device according to claim 2, wherein:
the stroke sensor has a characteristic that an inductance increases as temperature rises; and
the capacitor has a characteristic that a capacitance decreases as temperature rises.

7. The suspension device according to claim 3, wherein:
the stroke sensor has a characteristic that an inductance increases as temperature rises; and
the capacitor has a characteristic that a capacitance decreases as temperature rises.

* * * * *